United States Patent
Wildeson et al.

(10) Patent No.: US 9,238,747 B2
(45) Date of Patent: Jan. 19, 2016

(54) STAIN BLOCKING COMPOSITIONS

(75) Inventors: Jacob Wildeson, Chambersburg, PA (US); John Kelly, Gastonia, NC (US); Audrey Cosyns, Mannheim (DE); Harm Wiese, Laudenbach (DE)

(73) Assignee: BASF SE, Rheinland-Pfalz (DE)

( * ) Notice: Subject to any disclaimer, the term of this patent is extended or adjusted under 35 U.S.C. 154(b) by 1067 days.

(21) Appl. No.: 12/272,016

(22) Filed: Nov. 17, 2008

(65) Prior Publication Data

US 2010/0124614 A1 May 20, 2010

(51) Int. Cl.
| | | |
|---|---|---|
| C08L 37/00 | (2006.01) |
| C08L 39/00 | (2006.01) |
| B05D 3/02 | (2006.01) |
| C08L 31/00 | (2006.01) |
| C08L 33/00 | (2006.01) |
| C08F 220/06 | (2006.01) |
| C08L 33/06 | (2006.01) |
| C09D 133/08 | (2006.01) |
| C09D 133/00 | (2006.01) |
| C09D 133/10 | (2006.01) |
| C09D 143/02 | (2006.01) |

(52) U.S. Cl.
CPC ............ *C09D 133/08* (2013.01); *C09D 133/00* (2013.01); *C09D 133/10* (2013.01); *C09D 143/02* (2013.01)

(58) Field of Classification Search
CPC .. C09D 133/00; C09D 143/02; C09D 133/10; C09D 133/08
USPC ........................................................ 427/385.5
See application file for complete search history.

(56) References Cited

U.S. PATENT DOCUMENTS

| | | | |
|---|---|---|---|
| 5,191,029 | A | 3/1993 | DelDonno |
| 5,256,746 | A | 10/1993 | Blankenship et al. |
| 5,385,960 | A | 1/1995 | Emmons et al. |
| 5,922,410 | A | 7/1999 | Swartz et al. |
| 6,080,802 | A | 6/2000 | Emmons et al. |
| 6,228,913 | B1 | 5/2001 | Owens et al. |
| 6,485,786 | B2 | 11/2002 | Deng et al. |
| 6,710,161 | B2 | 3/2004 | Bardman et al. |
| 6,733,884 | B2 | 5/2004 | Brown |
| 6,756,459 | B2 | 6/2004 | Larson et al. |
| 6,777,489 | B1 | 8/2004 | Carey et al. |
| 6,784,262 | B2 | 8/2004 | Blankenship |
| 6,818,697 | B2 | 11/2004 | Zhang et al. |
| 7,179,531 | B2 | 2/2007 | Brown et al. |
| 7,285,590 | B2 | 10/2007 | Holub et al. |
| 2002/0090459 | A1* | 7/2002 | Even ........................... 427/385.5 |
| 2004/0054063 | A1 | 3/2004 | Brown et al. |
| 2004/0122131 | A1 | 6/2004 | Brown et al. |
| 2004/0247783 | A1 | 12/2004 | Rosano |
| 2005/0071023 | A1 | 3/2005 | Gilliland et al. |
| 2005/0107527 | A1* | 5/2005 | Holub et al. .................. 524/817 |
| 2005/0131176 | A1 | 6/2005 | Zhao |
| 2005/0222299 | A1* | 10/2005 | Garzon et al. ................. 523/407 |
| 2005/0256257 | A1 | 11/2005 | Betremieux et al. |
| 2006/0088782 | A1* | 4/2006 | Lee et al. .................. 430/137.11 |
| 2006/0223911 | A1 | 10/2006 | Bardman et al. |
| 2007/0021536 | A1 | 1/2007 | Pressley et al. |
| 2007/0208129 | A1 | 9/2007 | Finegan et al. |
| 2008/0115900 | A1 | 5/2008 | Haigh et al. |
| 2008/0146724 | A1 | 6/2008 | Bohling et al. |

FOREIGN PATENT DOCUMENTS

| | | |
|---|---|---|
| EP | 0625541 | 5/1994 |
| EP | 0376591 | 8/1995 |
| EP | 0615534 | 4/1997 |
| EP | 0792890 | 9/1997 |
| EP | 0615535 | 5/1998 |
| EP | 1302515 | 4/2003 |
| EP | 1371679 | 12/2003 |
| EP | 1433797 | 6/2004 |
| EP | 1923505 | 5/2005 |
| EP | 1714757 | 10/2006 |
| EP | 1193298 | 11/2006 |
| EP | 1725595 B1 | 7/2007 |
| EP | 1832635 | 9/2007 |
| EP | 1149875 | 2/2008 |
| EP | 1932862 | 6/2008 |
| GB | 1277877 | 6/1972 |
| WO | WO 2007014236 | 2/2007 |
| WO | 2007031480 | 3/2007 |

OTHER PUBLICATIONS

International Search Report and Written Opinion, dated Apr. 1, 2010, in International Application No. PCT/EP2009/064952, (11 pages).

* cited by examiner

*Primary Examiner* — David Karst
(74) *Attorney, Agent, or Firm* — Meunier Carlin Curfman LLC

(57) ABSTRACT

An aqueous coating composition for blocking stains and a method of using the coating composition is described. The coating composition includes an aqueous dispersion of a copolymer that is derived from a single stage emulsion polymerization of an ethylenically unsaturated nonionic monomer, greater than 0 and less than 1.5% by weight of an ethylenically unsaturated strong acid monomer or salt thereof, and greater than 1.5% and less than 3% by weight of methacrylic acid.

13 Claims, No Drawings

STAIN BLOCKING COMPOSITIONS

TECHNICAL FIELD

This disclosure relates to stain blocking primer compositions, and more particularly to stain blocking compositions that include an aqueous copolymer dispersion and to methods of making and using the stain blocking compositions.

BACKGROUND

Stain blocking coating compositions (i.e., primers) are applied to the surfaces of substrates, including uncoated surfaces or previously coated substrates. These coatings promote adhesion and also serve as a barrier coating to underlying polar or non-polar staining agents. Substrates frequently contain soluble or mobile staining agents. Given the nature of water-based coatings, the staining agents often leach from the substrate into and/or through the coating, causing surface discoloration of the coating. For example, tannins contained in woods such as redwood, cedar, elm, merbau and mahogany can leach from the substrate into the coating, causing tannin staining, which appears as discoloration on the surface of the coating. The visual appearance of localized stains or discoloration also can be manifested from extractives of previously coated substrates due to substrate exposure to water or humidity spots. In addition, salts contained in cementitious substrates often cause efflorescence, which is a staining caused by the migration of the salt from the substrate to the paint coating, where it appears as white deposits. Staining of the substrate, and of coatings previously applied to the substrate, can also be caused by sources external to the substrate. For example, cigarette smoke causes nicotine staining, which discolors light colored coatings; inks from pens cause marker stains on the substrate. Each of these types of staining is highly undesirable in coatings.

SUMMARY

An aqueous coating composition for blocking stains is provided, comprising an aqueous dispersion comprising a copolymer derived from a single stage emulsion polymerization of an ethylenically unsaturated nonionic monomer, greater than 0 and less than 1.5% by weight of an ethylenically unsaturated strong acid monomer or salt thereof, and greater than 1.5% and less than 3% by weight of methacrylic acid or salt thereof. The ethylenically unsaturated nonionic monomer can include an alkyl acrylate such as butyl acrylate and 2-ethylhexyl acrylate, and can further include styrene, vinyl acetate, or a monomer including pendant functional groups. The copolymer can include less than 1.2% by weight of an ethylenically unsaturated strong acid monomer or salt thereof and the ethylenically unsaturated strong acid monomer can include a phosphorous-containing monomer such as phosphoethyl(meth)acrylate. The copolymer can have a glass transition temperature (Tg) from 0° C. to 45° C. In some embodiments, the copolymer is derived from monomers consisting of an ethylenically unsaturated nonionic monomer, an ethylenically unsaturated strong acid monomer or salt thereof, and methacrylic acid or salt thereof. In some embodiments, the copolymer can be derived from 30-60% by weight styrene, 15-40% by weight ethylhexyl acrylate, 10-35% by weight butyl acrylate, 0.5-5% by weight ureido functional monomer, 0.2-2% by weight ethylenically unsaturated strong acid monomer or salt thereof, and 1.5%-3% by weight methacrylic acid or salt thereof.

A method for blocking stains is also provided comprising forming an aqueous coating composition comprising a copolymer as described above, applying the aqueous coating composition to a substrate having a stain, and drying, or allowing to dry, said aqueous coating composition to block the stain.

The details of one or more embodiments are set forth in the description below. Other features, objects, and advantages will be apparent from the description and from the claims.

DETAILED DESCRIPTION

The term "comprising" and variations thereof as used herein are used synonymously with the term "including" and variations thereof and are open, non-limiting terms.

The term "stain" as used herein includes any mark, blemish, discoloration, or any deposit, whether or not visible or readily apparent to the naked eye. The term "stain" thus includes marks caused by inks, crayons, lipstick, grease pencils, smoke residue, tannins, water extracts, and the like. These stains may be found on residential or commercial walls as graffiti, markings from pens or color markers, on or native to wooden substrates, on wood-composite substrates, on concrete substrates, on paper substrates (such as wall board coverings), and on other substrates that are normally painted with one or more liquid coatings.

The term "stain blocking" as used herein means binding, blocking or masking a stain where it cannot be seen, or is substantially less visible, once one or more liquid coatings are applied and dried, or in those cases where the stain is not visible or only slightly visible, that the stain cannot migrate through the one or more subsequently applied and dried liquid coatings.

An aqueous coating composition for blocking stains includes an aqueous copolymer dispersion. The copolymer is derived from a single stage emulsion polymerization of an ethylenically unsaturated nonionic monomer, greater than 0 and less than 1.5% by weight of an ethylenically unsaturated strong acid monomer or a salt thereof, and greater than about 1.5% and less than about 3% by weight of methacrylic acid or a salt thereof.

Suitable ethylenically unsaturated nonionic monomers include any monomers or monomer residues that have no pendant acid or base group. Representative examples of suitable ethylenically unsaturated nonionic monomers include alkyl esters of acrylic acid or methacrylic acid such as methyl acrylate or methyl methacrylate, ethyl acrylate or ethyl methacrylate, butyl acrylate or butyl methacrylate, 2-ethylhexyl acrylate or 2-ethylhexyl methacrylate, cyclohexyl acrylate or cyclohexyl methacrylate, octyl acrylate or octyl methacrylate, decyl acrylate or decyl methacrylate, isodecyl acrylate or isodecyl methacrylate, lauryl acrylate or lauryl methacrylate, oleyl acrylate or oleyl methacrylate, palmityl acrylate or palmityl methacrylate, stearyl acrylate or stearyl methacrylate, hydroxyethyl acrylate or hydroxyethyl methacrylate, and hydroxypropyl acrylate or hydroxypropyl methacrylate; acrylonitrile or methacrylonitrile; acrylamide or methacrylamide; amino-functional monomers such as dimethylaminoethyl acrylate or dimethylaminoethyl methacrylate; ureido-functional monomers such as N-(2-methacryloyloxyethyl) ethylene urea; silane-functional monomers such as methacryloxypropyltrimethoxy silane and vinyltriacetoxysilane; styrene and substituted styrenes; butadiene; ethylene; propylene; α-olefins such as 1-decene, vinyl acetate, vinyl versatate, vinyl butyrate and other vinyl esters; vinyl monomers such as vinyl chloride, vinyl toluene, vinyl naphthalene and vinyl benzophenone; and vinylidene chloride; and combinations thereof. The selection of particular ethylenically unsaturated nonionic monomers can be based on reaching a target glass transition temperature or to provide other desired properties to the copolymer.

In some embodiments, the ethylenically unsaturated nonionic monomer can include one or more alkyl acrylates. For example, the ethylenically unsaturated nonionic monomer can include 2-ethylhexyl acrylate and can optionally further include butyl acrylate. In some embodiments, the ethylenically unsaturated nonionic monomer can include styrene and the alkyl acrylate. In some embodiments, the ethylenically unsaturated nonionic monomer can include vinyl acetate and the alkyl acrylate.

In some embodiments, the ethylenically unsaturated nonionic monomer can include monomers having functional pendant groups which promote wet adhesion onto various substrates. These groups can include, but are not limited to, amino, silane, imidazole, acetoacetonate, imidazolidone, diamine, urea and ureido functional groups. For example, the functional monomer can be a ureido-functional monomer such as N-(2-methacryloyloxyethyl)ethylene urea.

Suitable ethylenically unsaturated strong acid monomers include any monomers that have a pendant acid group with a pKa (in water at 20° C.) of less than 4 or salts of such monomers. Suitable salts of acid monomers include ammonium, sodium, potassium and lithium salts. Representative examples of suitable ethylenically unsaturated strong acid monomers or salts thereof include 2-acrylamido-2-methylpropane sulfonic acid; 1-allyloxy-2-hydroxypropane sulfonic acid; vinylsulfonic acid; styrene sulfonic acid; alkyl allyl sulfosuccinic acid; sulfoethyl acrylate or sulfoethyl methacrylate; phosphoalkyl acrylates or phosphoalkyl methacrylates such as phospho ethyl acrylate or phospho ethyl methacrylate, phosphopropyl acrylate or phosphopropyl methacrylate, phosphobutyl acrylate or phosphobutyl methacrylate, phosphate ester of polyethyleneglycol acrylate or polyethyleneglycol methacrylate and phosphate ester of polypropyleneglycol acrylate or polypropyleneglycol methacrylate; phosphoalkyl crotonates; phosphoalkyl maleates; phosphoalkyl fumarates; phosphodialkyl acrylates or phosphodialkyl methacrylates; phosphodialkyl crotonates; allyl phosphate; and combinations thereof.

In some embodiments, the ethylenically unsaturated strong acid monomer can have a weight percentage of less than about 1.2% or even less than about 1.0%. In some embodiments, the ethylenically unsaturated strong acid monomer can include a phosphorous-containing monomer that may include phosphoethyl acrylate or phosphoethyl methacrylate, or a combination of both.

The copolymer can be derived from methacrylic acid in an amount of from about 1.5% to about 3.0% by weight. In some embodiments, the copolymer can be derived from methacrylic acid in an amount of from about 1.8% to about 2.5% by weight. In some embodiments, the copolymer can include additional carboxylic acids such as acrylic acid and itaconic acid. However, the copolymer can, in some embodiments, not be derived from additional carboxylic acids such as acrylic acid and itaconic acid.

In some embodiments, the copolymer can have a glass transition temperature of about 0° C. to about 45° C. Glass transition temperature can be measured using differential scanning calorimetry. In some embodiments, the copolymer can be derived from monomers consisting of an ethylenically unsaturated nonionic monomer, an ethylenically unsaturated strong acid monomer or salt thereof, and methacrylic acid or salt thereof. In some embodiments, the copolymer can be derived from 30-55% by weight styrene; 20-65% by weight 2-ethylhexyl acrylate; 0.5-5% by weight of a ureido-functional monomer; 0.2-2% by weight of an ethylenically unsaturated strong acid monomer or salt thereof, and 1.5%-3% by weight methacrylic acid or a salt thereof. In some embodiments, a portion of the 2-ethylhexyl acrylate can be replaced with butyl acrylate.

The aqueous copolymer dispersion can be prepared by polymerizing the monomer components using free-radical aqueous emulsion polymerization. The emulsion polymerization is performed in a single stage. The emulsion polymerization temperature is generally from about 30° C. to about 95° C. or from about 70° C. to about 90° C. The polymerization medium can include water alone or a mixture of water and water-miscible liquids, such as methanol. In some embodiments, water is used alone. The emulsion polymerization can be carried out either as a batch process or in the form of a feed process, including a step or gradient procedure. In some embodiments, a feed process is used in which part of the polymerization batch is heated to the polymerization temperature and partially polymerized, and the remainder of the polymerization batch is subsequently fed to the polymerization zone continuously, in steps or with superposition of a concentration gradient, usually via a plurality of spatially separate feed streams, of which one or more contain the monomers in pure or emulsified form, while maintaining the polymerization.

The initially introduced mixture and/or the monomer feed stream can contain small amounts of surfactants, generally less than about 0.5% by weight, based on the total amount of monomers to be polymerized. Representative examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; alcohols or phenols, and combinations thereof. These surfactants can in many cases be alkoxylated, and are typically ethoxylated using ethylene oxide. In some embodiments, the surfactants can include at least one anionic surfactant, at least one nonionic surfactant, or a combination thereof. For example, nonionic alkoxylated carboxylic acids or alcohols having from 8 to 24 carbon atoms (e.g. 12 or 16 carbon atoms) and/or anionic aryl (e.g. tristyryl)phenol phosphates can be used in the aqueous composition. In some embodiments, the monomers can be fed to the polymerization zone after pre-emulsification with these assistant surfactants. In some embodiments, one or more of the surfactants can also be added after polymerization.

The free-radical emulsion polymerization can be carried out in the presence of a free-radical polymerization initiator. The free-radical polymerization initiators that can be used in the process are all those which are capable of initiating a free-radical aqueous emulsion polymerization including alkali metal peroxydisulfates and $H_2O_2$, or azo compounds. Combined systems can also be used comprising at least one organic reducing agent and at least one peroxide and/or hydroperoxide, e.g., tert-butyl hydroperoxide and the sodium metal salt of hydroxymethanesulfinic acid or hydrogen peroxide and ascorbic acid. Combined systems can also be used additionally containing a small amount of a metal compound which is soluble in the polymerization medium and whose metallic component can exist in more than one oxidation state, e.g., ascorbic acid/iron(II) sulfate/hydrogen peroxide, where ascorbic acid can be replaced by the sodium metal salt of hydroxymethanesulfinic acid, sodium sulfite, sodium hydrogen sulfite or sodium metal bisulfite and hydrogen peroxide can be replaced by tert-butyl hydroperoxide or alkali metal peroxydisulfates and/or ammonium peroxydisulfates.

In general, the amount of free-radical initiator systems employed is from about 0.1 to about 2% by weight, based on the total amount of the monomers to be polymerized. In some embodiments, the initiators are ammonium and/or alkali metal peroxydisulfates (e.g. sodium peroxydisulfates), alone or as a constituent of combined systems.

The manner in which the free-radical initiator system is added to the polymerization reactor during the free-radical aqueous emulsion polymerization is not critical. It can either all be introduced into the polymerization reactor at the beginning, or added continuously or stepwise as it is consumed during the free-radical aqueous emulsion polymerization. In detail, this depends in a manner known to an average person skilled in the art both from the chemical nature of the initiator system and on the polymerization temperature. In some embodiments, some is introduced at the beginning and the remainder is added to the polymerization zone as it is consumed. It is also possible to carry out the free-radical aqueous emulsion polymerization under superatmospheric or reduced pressure.

Chain transfer agents such as, for example, halogen compounds such as tetrabromomethane; allyl compounds; or mercaptans such as alkyl thioglycolates, alkyl mercaptoalkanoates such as isooctyl mercaptopropionate, and $C_4$-$C_{22}$ linear or branched alkyl mercaptans such as t-dodecyl mercaptan may be used to control the molecular weight of the emulsion copolymer. Chain transfer agent(s) may be added in one or more additions or continuously, linearly or not, over most or all of the reaction period or during limited portion(s) of the reaction period. In general, the amount of chain transfer agent(s) used is less than about 5% by weight, based on the total amount of the monomers to be polymerized.

The aqueous polymer dispersions can be prepared with total solids contents of from 10 to 75% by weight, 15 to 65% by weight, or 20 to 60% by weight. The aqueous polymer dispersions can then be concentrated if desired to provide a total solids content of 40-75% by weight. The aqueous polymer dispersion can be converted, in a manner known per se, to redispersible polymer powders (e.g., spray drying, roll drying or suction-filter drying). If the aqueous polymer dispersion is to be dried, drying aids can be used with the dispersion. The copolymers have a long shelf life and can be redispersed in water for use in the stain blocking coating compositions.

The aqueous polymer dispersion can be mixed with other components, such as polymeric binders, thickeners, fillers, pigments, dyes, and other additives. The order of mixing is not critical although enough water needs to be present in the composition for the addition of solid components such as certain fillers.

The aqueous composition may be applied by any suitable methods such as, for example, brushing and spraying methods such as, for example, roll coating, doctor-blade application, printing methods, air-atomized spray, air-assisted spray, airless spray, high volume low pressure spray, and air-assisted airless spray.

In a method for blocking stains, the aqueous coating composition may be applied to a substrate such as, for example, metal, wood, wood composites, concrete, paper (such as wall board coverings), and other such substrates that are normally painted with one or more liquid coatings. In some embodiments, the substrate can be a primed surface and even a previously painted surface. The aqueous coating composition on the substrate may be dried, or allowed to dry, with or without heating, to form a stain-blocking coating.

EXAMPLES

An Example of the stain blocking composition was compared to a Comparative Example by including both compositions in primer formulations of 28% PVC, 100 g/L VOC, and containing no zinc oxide. The stain blocking composition according to the Comparative Example was prepared through emulsion polymerization and had the following composition: 102 parts of water, 1.5 parts of Disponil FES 77 (available from Cognis Corporation), 0.4 parts of ammonium hydroxide, 2.5 parts of acrylic acid, 47.2 parts of ethylhexyl acrylate, 42.5 parts of styrene, 7.8 parts of Rohamere 6844 (25% UMA, available from Rohm Tech Inc.), and 0.2 parts of t-DMK. The stain blocking composition according to the Example was also prepared by emulsion polymerization and included by weight: 102 parts of water, 1.5 parts of Disponil FES 77, 1.0 part of Sipomer PAM 4000, 0.4 parts of ammonium hydroxide, 2.0 parts of methacrylic acid, 47.0 parts of ethylhexyl acrylate, 42.2 parts of styrene, 7.8 parts of Rohamere 6844 and 0.2 parts of t-DMK.

A high quality all acrylic interior flat paint (film A) was cast onto a white scrub chart form P122-10N. The dry thickness of film A was between 3-4 mils. The paint film was allowed to cure for at least 7 days.

A wide, even band of sharpie permanent black (stain 1) was then applied perpendicular to the acrylic flat paint film A. The total width of the stain 1 band was at least 1 inch. A wide, even band of crayola washable green window marker (stain 2) was also applied perpendicular to the acrylic flat paint film A and at least 3 inches below the stain 1 band. The total width of the stain 2 band was also at least 1 inch. The stain 1 & 2 bands were allowed to dry for at least 24 hrs.

A primer comprising the stain blocking composition according to the Comparative Example and a primer comprising the stain blocking composition according to the Example were then applied over both stain 1 and stain 2 at approximately 3.5 mils wet film thickness. The primers were applied simultaneously in a side by side arrangement for ease of visual and spectrometric comparison. The primers were allowed to dry for 3 hours.

The paint used for film A was re-applied over the composite panel at a wet film thickness of approximately 5 mils (film B). This panel was then allowed to dry overnight.

Total color difference readings ($\Delta E$) were then measured by fixing an unstained portion of film B as the color blank or standard, followed by reading the subsequent stained portions of the primers against the standard. The results were:

| Composition in Primer | $\Delta E$ Sharpie | $\Delta E$ Crayola Green Marker |
| --- | --- | --- |
| Comparative Example | 2.3 | 16.8 |
| Example | 2.0 | 9.2 |

The primer comprising the stain blocking composition according to the Comparative Example and the primer comprising the stain blocking composition according to the Example were also coated onto a tannin rich 1 inch×6 inch cedar board with a dry film thickness of about 2 mils. The primer coatings were allowed to dry overnight.

The coated cedar board was then placed in a humidity chamber or water bath at 65° C., with the coated side down towards the water approximately 3 inches from the water surface. The coated board was allowed to "steam" for approximately 48 hours to allow the tannins to leach through. The coated board was then removed from the humidity chamber or water bath, followed by reading the yellowness and whiteness indices (ASTM E313) of the primer portions. The results were:

| Composition in Primer | Post Exposure Yellowness Index |
|---|---|
| Comparative Example | 13.7 |
| Example | 12.3 |

| Composition in Primer | Post Exposure Whiteness Index |
|---|---|
| Comparative Example | 33.3 |
| Example | 39.3 |

ASTM Standard D3359—Dry Adhesion Method (Cross-Cut) was performed on both the primer including the stain blocking composition according to the Comparative Example and the primer including the stain blocking composition according to the Example after 24 hours dry time on multiple substrates. The results were:

| Composition in Primer | Aluminum | Galvanized Steel | Glazed Ceramic Tile | Aged Alkyd Paint |
|---|---|---|---|---|
| Comparative Example | 5B | 2B | 2B | 5B |
| Example | 5B | 5B | 5B | 5B |

The ratings ranged from 0 to 5B where 5B is the best adhesion where no part of the cross-cut coating is removed and 0 is complete removal or adhesive failure of the cross-cut coating.

Viscosity measurements showed that the primer including the stain blocking composition according to the Example increased viscosity response compared to the primer including the stain blocking composition according to the Comparative Example in that 25% less thickener was required to achieve comparable KU and ICI viscosities.

A number of embodiments have been described. Nevertheless, it will be understood to one skilled in the art that various modifications may be made. Further, while only certain representative combinations of the formulations, methods, or products are disclosed herein are specifically described, other combinations of the method steps or combinations of elements of a composition or product are intended to fall within the scope of the appended claims. Thus a combination of steps, elements, or components may be explicitly mentioned herein; however, all other combinations of steps, elements, and components are included, even though not explicitly stated.

What is claimed is:

1. An aqueous coating composition for blocking stains, comprising:
   an aqueous dispersion comprising a single stage emulsion copolymer having a glass transition temperature (Tg) of from 0° C. to 45° C. and derived from a single stage emulsion polymerization of ethylenically unsaturated nonionic monomers comprising 30 to 60% by weight styrene, 15 to 65% by weight 2-ethylhexyl acrylate, 0 to 35% by weight butyl acrylate, and 0.5 to 5% by weight ureido functional monomer, greater than 0 and less than 1.5% by weight of an ethylenically unsaturated strong acid monomer or salt thereof, and greater than 1.5% and less than 3% by weight of methacrylic acid or salt thereof,
   wherein all the copolymers in the dispersion derived from an alkyl ester of acrylic acid or methacrylic acid have a glass transition temperature (Tg) of from 0° C. to 45° C.

2. The composition according to claim 1, wherein the ethylenically unsaturated nonionic monomer further comprises vinyl acetate.

3. The composition according to claim 1, wherein the ethylenically unsaturated nonionic monomer further comprises a monomer having a functional pendant croup, wherein the functional pendant group comprises one or more of amino, silane, imidazole, acetoacetonate, imidazolidione, and diamine functional groups.

4. The composition according to claim 1, wherein the single stage emulsion copolymer comprises greater than 0 and less than 1.2% by weight of the ethylenically unsaturated strong acid monomer or salt thereof.

5. The composition according to claim 1, wherein the ethylenically unsaturated strong acid monomer comprises a phosphorous-containing monomer.

6. The composition according to claim 5, wherein the ethylenically unsaturated strong acid monomer or salt thereof comprises phosphoethyl(meth)acrylate.

7. The composition according to claim 1, further comprising one or more surfactants.

8. The composition according to claim 7, wherein the one or more surfactants include a tristyrylphenol phosphate.

9. The composition according to claim 7, wherein the one or more surfactants include a nonionic alkoxylated carboxylic acid or alcohol having from 8 to 24 carbon atoms.

10. The composition according to claim 1, wherein the single stage emulsion copolymer is derived from monomers consisting of the ethylenically unsaturated nonionic monomers, the ethylenically unsaturated strong acid monomer or salt thereof, and the methacrylic acid or salt thereof.

11. A method for blocking stains, comprising:
   (a) forming the aqueous coating composition of claim 1;
   (b) applying said aqueous coating composition to a substrate having a stain; and
   (c) drying, or allowing to dry, said aqueous coating composition to block the stain.

12. The composition according to claim 1, wherein all the copolymers in the dispersion have a glass transition temperature (Tg) of from 0° C. to 45° C.

13. The composition according to claim 1, wherein the single stage emulsion copolymer is derived from greater than 0 to 35% by weight of the butyl acrylate.

* * * * *